United States Patent
Monti

(10) Patent No.: US 9,014,926 B2
(45) Date of Patent: Apr. 21, 2015

(54) METHOD AND SYSTEM FOR DIAGNOSING THE OPERATING STATUS OF AN ASSISTED START-UP MODE FOR A MOTOR VEHICLE

(75) Inventor: Alessandro Monti, La Garenne Colombes (FR)

(73) Assignee: Renault S.A.S., Boulogne-Billancourt (FR)

(*) Notice: Subject to any disclaimer, the term of this patent is extended or adjusted under 35 U.S.C. 154(b) by 405 days.

(21) Appl. No.: 12/988,433

(22) PCT Filed: Mar. 5, 2009

(86) PCT No.: PCT/FR2009/050355
§ 371 (c)(1),
(2), (4) Date: Jun. 6, 2011

(87) PCT Pub. No.: WO2009/144421
PCT Pub. Date: Dec. 3, 2009

(65) Prior Publication Data
US 2012/0004817 A1 Jan. 5, 2012

(30) Foreign Application Priority Data
Apr. 18, 2008 (FR) ..................................... 08 52656

(51) Int. Cl.
*G06F 7/00* (2006.01)
*G06F 17/00* (2006.01)
(Continued)

(52) U.S. Cl.
CPC ............ *B60T 7/12* (2013.01); *B60W 30/18027* (2013.01); *B60W 50/02* (2013.01);
(Continued)

(58) Field of Classification Search
USPC ......... 701/113, 31.7, 32.9, 36, 51, 62, 70, 61, 701/63, 48, 84, 29.1, 31.1; 180/275, 337; 303/191, 192, 20; 340/439, 447, 479; 477/184, 125, 185, 96, 176; 74/335; 192/219.1
See application file for complete search history.

(56) References Cited

U.S. PATENT DOCUMENTS 5,590,040 A 12/1996 Abe et al.
6,299,261 B1 * 10/2001 Weiberle et al. ................ 303/20
(Continued)

FOREIGN PATENT DOCUMENTS

DE 10 2007 021871 2/2008
FR 2 828 450 2/2003
(Continued)

OTHER PUBLICATIONS

IEEE 100 The Authoritative Dictionary of IEEE Standards Terms, 7th Edition, Standards Information Network IEEE Press, New York, N.Y., 2000.*
(Continued)

*Primary Examiner* — Helal A Algahaim
*Assistant Examiner* — Isaac Smith
(74) *Attorney, Agent, or Firm* — Oblon, McClelland, Maier & Neustadt, L.L.P.

(57) ABSTRACT

A method and system for diagnosing an operating status of an assisted start-up mode for a motor vehicle. The system includes a driving engine, a transmission including a mechanism determining a piece of engine rotation speed information, a piece of information on a position of an accelerator pedal of the vehicle, a piece of information on a position of a transmission, and a piece of information on torque transmitted to wheels, a detection mechanism producing a malfunction signal for the assisted start-up using the information received, a plurality of encoding mechanisms to produce a follow-up signal for each piece of calculated information received, and a memory saving the follow-up signals.

10 Claims, 11 Drawing Sheets

(51) Int. Cl.
   *G06F 19/00* (2011.01)
   *B60T 7/12* (2006.01)
   *B60W 30/18* (2012.01)
   *B60W 50/02* (2012.01)

(52) U.S. Cl.
   CPC .............. *B60W2510/0638* (2013.01); *B60W 2510/1005* (2013.01); *B60W 2520/30* (2013.01); *B60W 2540/10* (2013.01)

(56) References Cited

U.S. PATENT DOCUMENTS

| | | | |
|---|---|---|---|
| 7,206,682 B2 | 4/2007 | Bodin et al. | |
| 7,338,137 B2 * | 3/2008 | Kinder et al. | 303/191 |
| 7,356,399 B2 * | 4/2008 | Eguchi et al. | 701/61 |
| 7,665,808 B2 | 2/2010 | Deprez et al. | |
| 2004/0143695 A1 | 7/2004 | Hashimoto et al. | |
| 2009/0030570 A1 | 1/2009 | Regnard De Lagny et al. | |

FOREIGN PATENT DOCUMENTS

| | | |
|---|---|---|
| FR | 2 841 199 | 12/2003 |
| FR | 2 894 548 | 6/2007 |

OTHER PUBLICATIONS

International Search Report is issued Sep. 14, 2009 in PCT/FR09/50355 in filed Mar. 5, 2009.

* cited by examiner

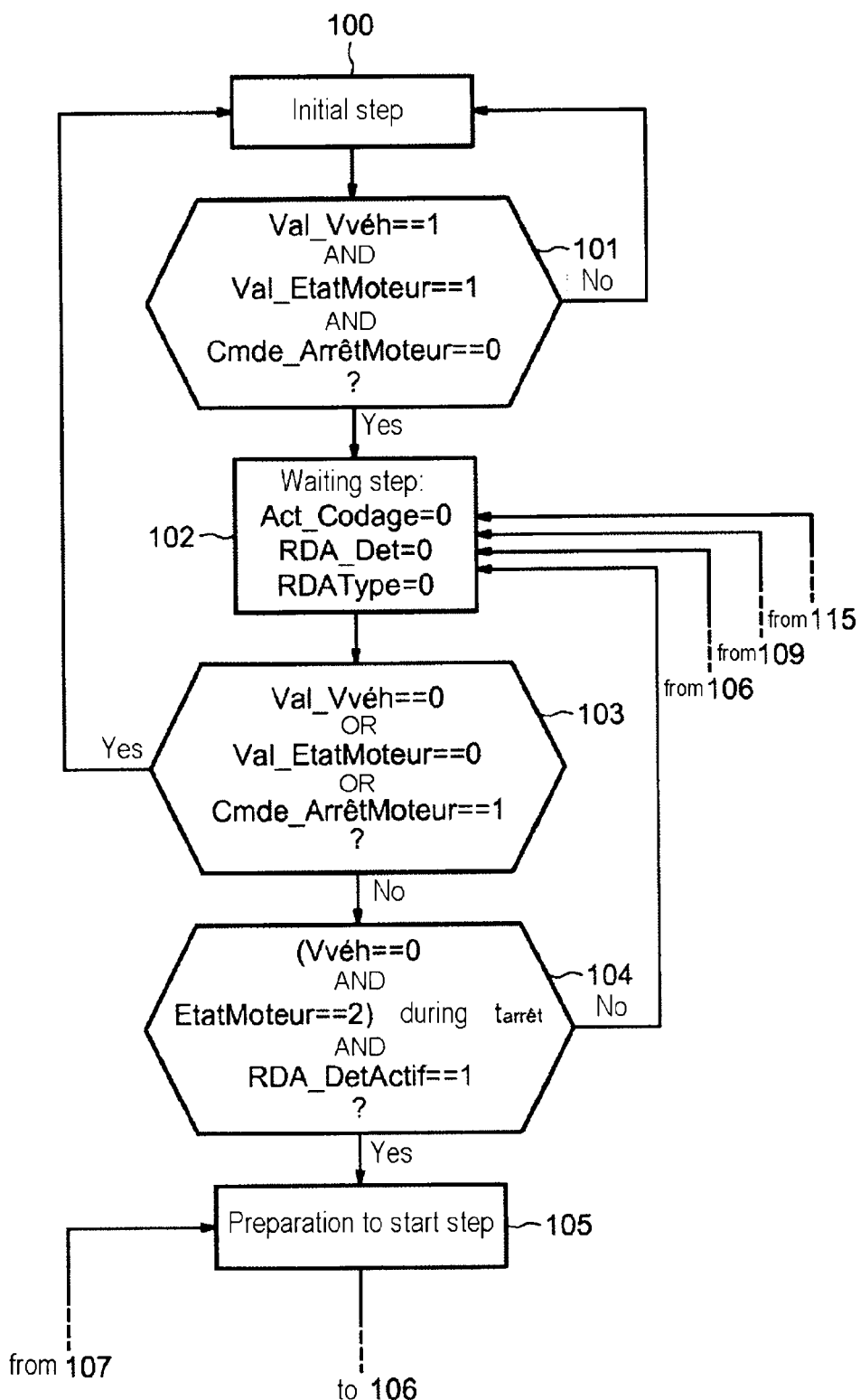

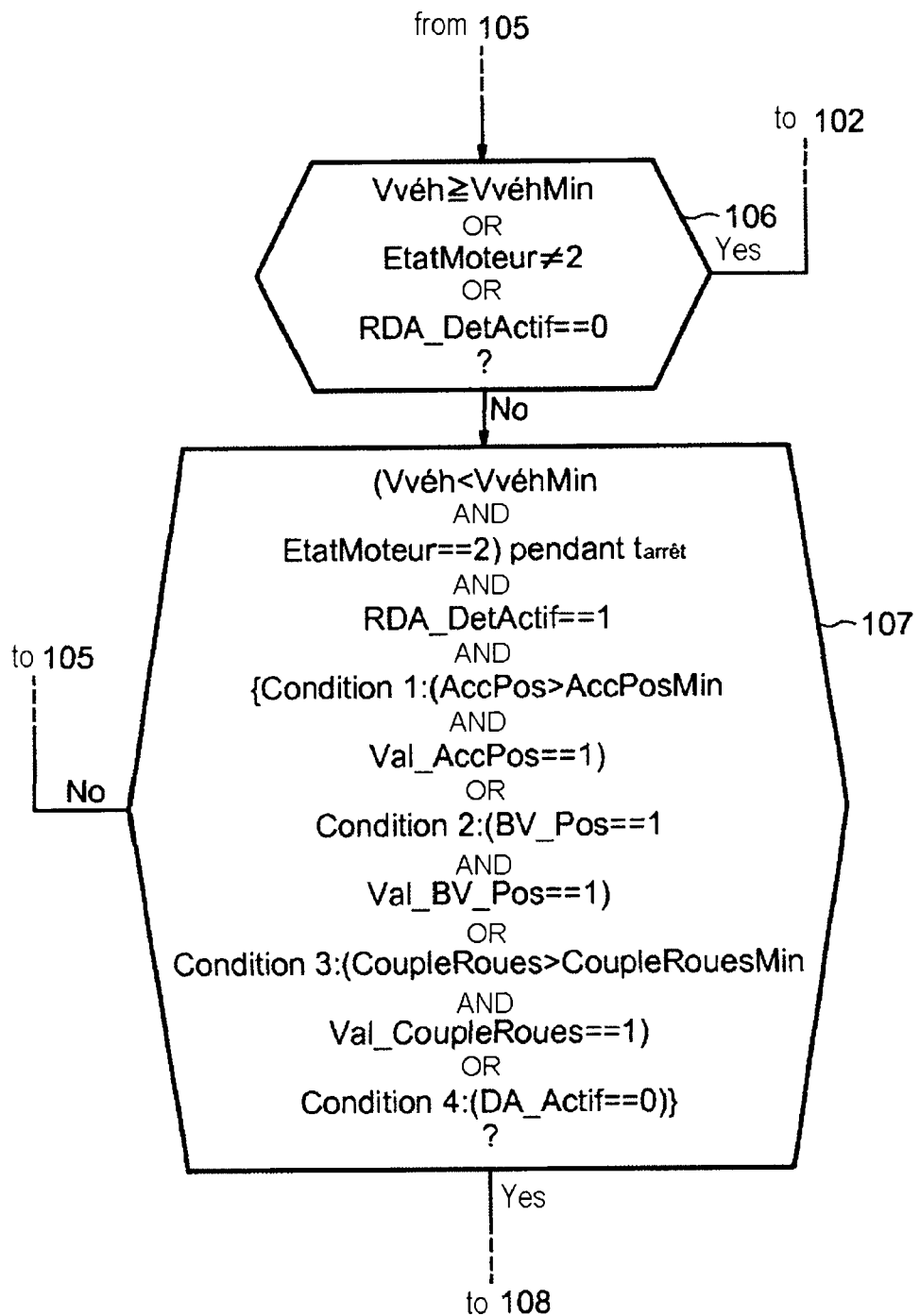

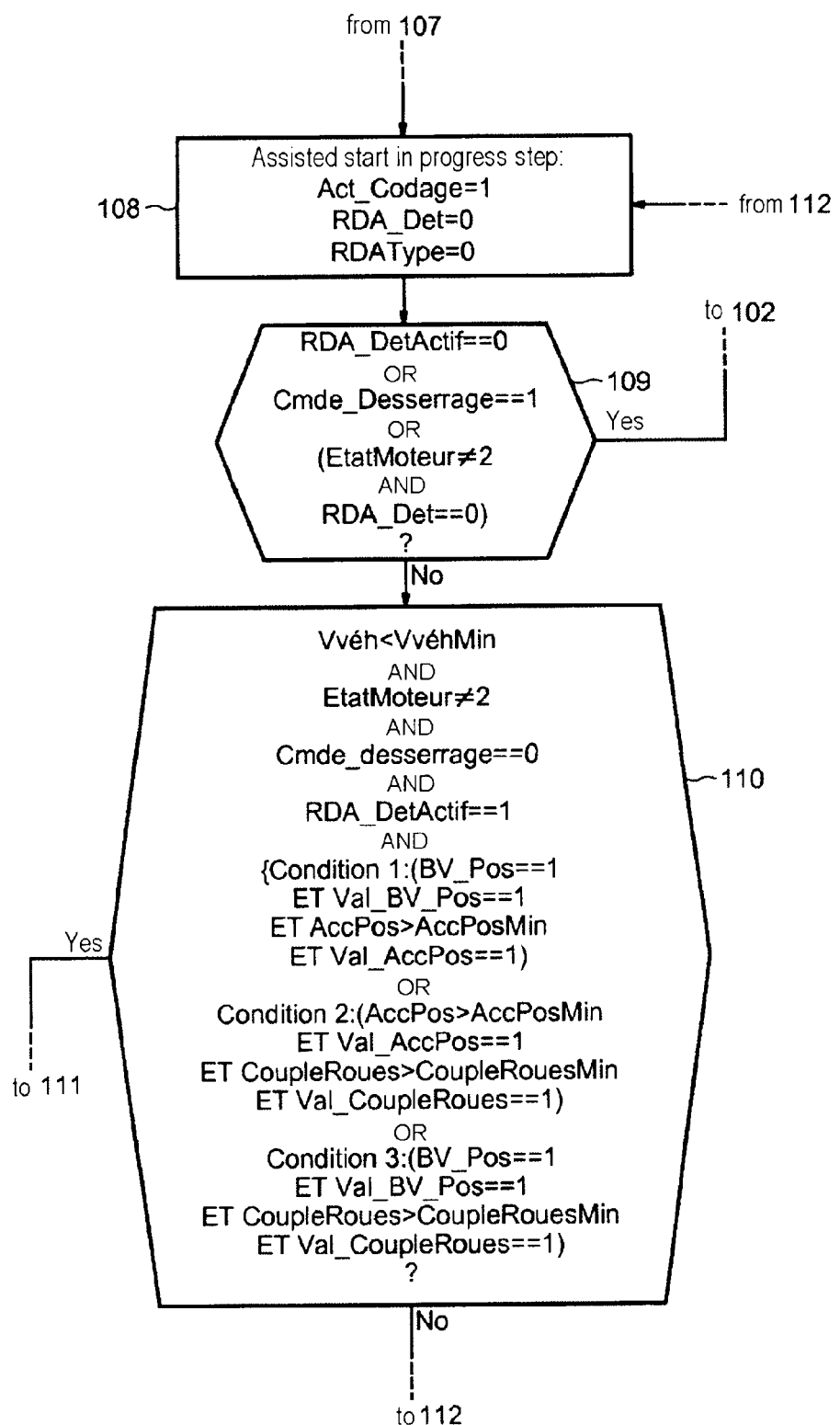

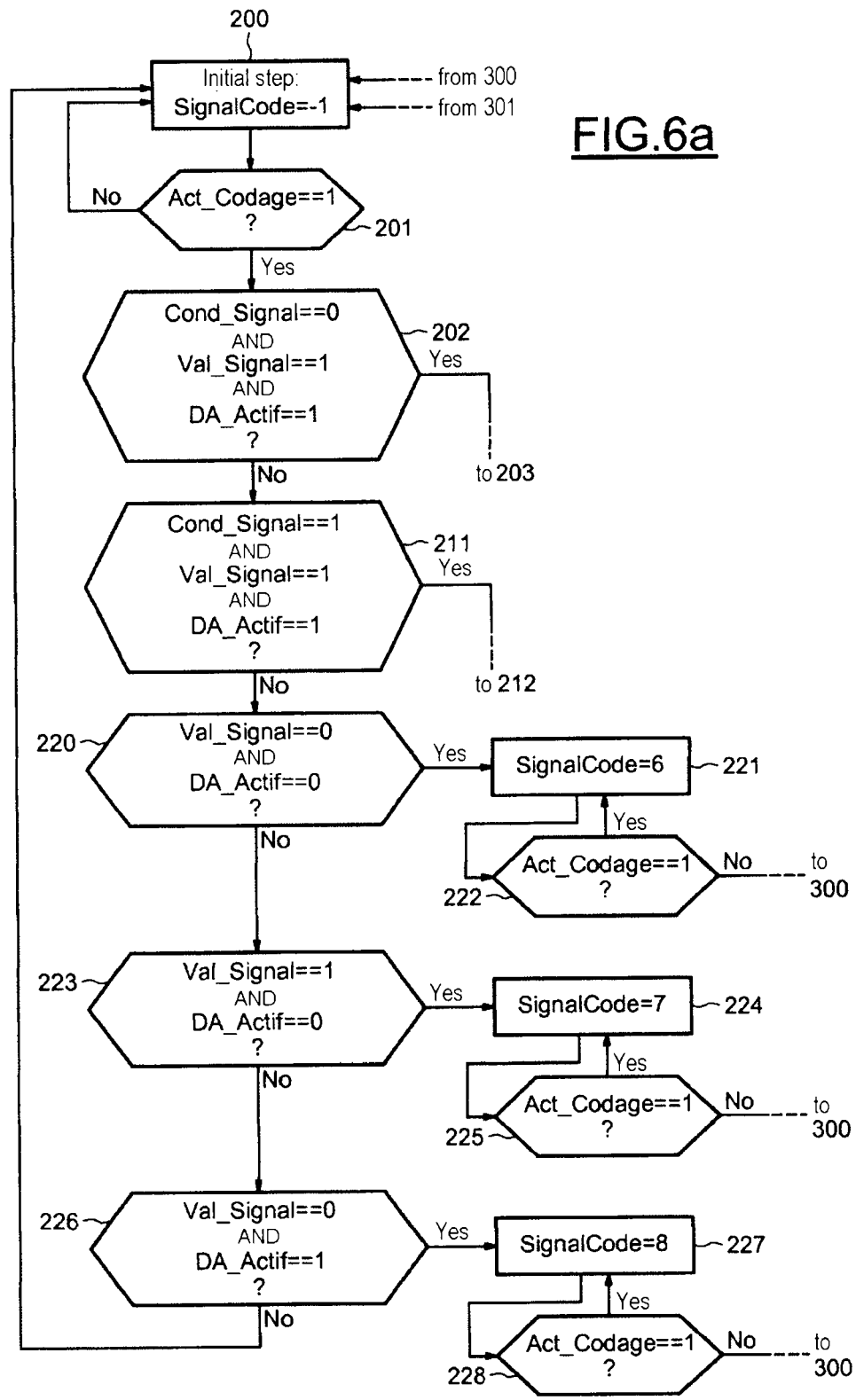

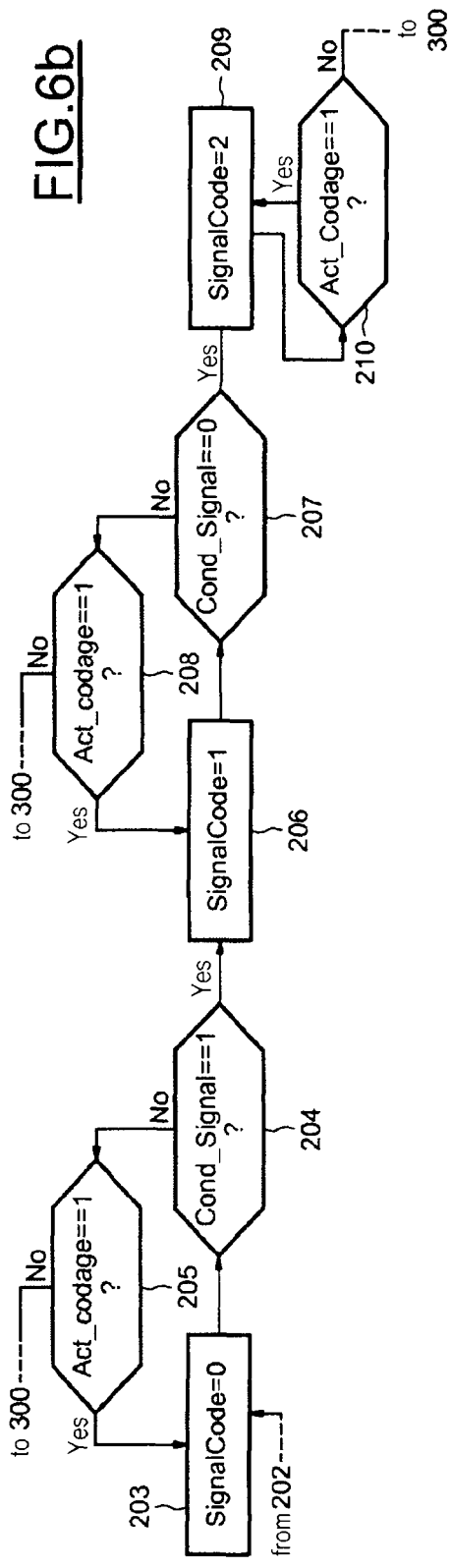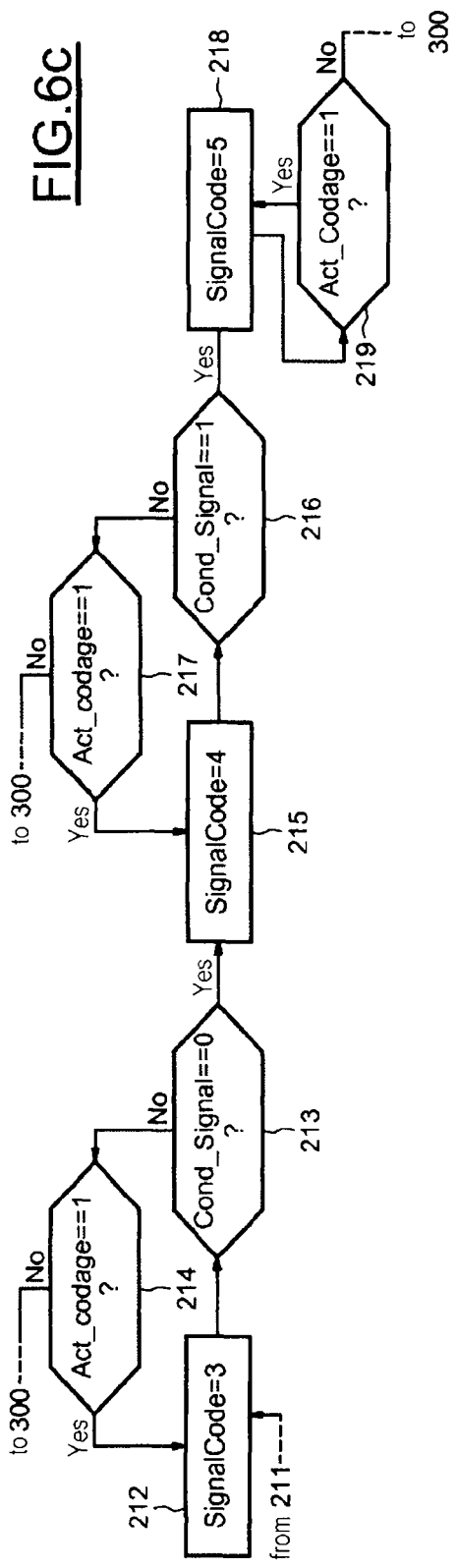

METHOD AND SYSTEM FOR DIAGNOSING THE OPERATING STATUS OF AN ASSISTED START-UP MODE FOR A MOTOR VEHICLE

BACKGROUND OF THE INVENTION

The invention relates to a method and a system for diagnosing the operating state of an assisted starting mode of a motor vehicle.

Currently, certain motor vehicles are fitted with an assisted starting mode which consists in managing the parking brake automatically when the vehicle is started. The parking brake is a braking system that supplements the brakes actuated by the brake pedal. This parking brake is usually used to immobilize the vehicle when the latter is stationary, and can also be used to carry out emergency braking when the vehicle is moving.

Automatic management of the parking brake makes it possible, amongst other things, to help the driver to carry out a starting on a slope, also called a "hill start". The principle of the hill start is to release the brakes on the non-drive wheels when the torque transmitted by the engine to the drive wheels is sufficient to compensate for the effect of the slope.

One of the problems encountered when automatic starting management is used is that this management may, in certain conditions, not request the release of the brakes thus refusing the assisted start.

It is therefore useful to be able to ascertain the conditions that have led to such a refusal for the purpose of diagnosing the possible faults of the automatic starting management system. Also, it may be worthwhile to save the traces of these refusal conditions, but the saves of these conditions may be numerous and occupy considerable memory space. The question is therefore to fit the vehicles with appropriate means for economizing on the memory space used by the saving means.

It is possible to cite for example the British patent application GB 2 376 990 which describes a parking-brake control system in which the parking brake is released when the vehicle is driven in a positive movement and the clutch pedal reaches a satisfactory position, but this document does not describe a means for diagnosing the conditions of refusal of an assisted start.

It is possible to cite also the British patent application GB 2 342 967 which discloses a parking-brake control device in which said brake is released when the braking torque applied to the wheels is below a certain threshold. Moreover, it is possible to cite the French patent application FR 2 828 450 filed in the name of the applicant which describes an assisted hill start device and the French patent application FR 2 841 199, also filed in the name of the applicant, which discloses a device for the automatic release of the automatic parking brake when starting. But these documents also do not disclose a means for diagnosing the conditions of refusal of an assisted start.

SUMMARY OF THE INVENTION

One of the objects of the invention is therefore to provide a system and a method for diagnosing the conditions of refusal of an assisted start by an automatic management mode.

Another object of the invention is to trace the history of these conditions with an optimized and the smallest possible memory occupancy.

The subject of the invention is therefore a system for diagnosing the operating state of an assisted starting mode of a motor vehicle fitted with a drive engine and a gearbox, comprising a means for determining an item of information on the engine rotation speed, an item of information on the position of the accelerator pedal of the vehicle, an item of information on the position of the gearbox and an item of information on the torque transmitted to the wheels.

This system comprises a detection means for generating a signal of malfunction of the assisted start based on said items of information received, several encoding means for generating a monitoring signal for each determined item of information received, and a memory for saving said monitoring signals.

Specifically, with the aid of a means for detecting and saving the conditions of refusal of an assisted start, it is possible to diagnose the causes of malfunction of the assisted start. Also with the aid of a means for encoding the selected items of information that describe in the best way possible the operating conditions of the assisted start, it is possible to greatly reduce the memory space occupied by these items of information.

According to another embodiment, when the assisted start is in operation, each encoding means is capable of modifying said monitoring signal by allocating thereto a value corresponding to distinct states of the determined item of information received.

By using a single monitoring variable per selected item of information, the memory occupancy is reduced because not all the values of the selected item of information throughout the assisted start are recorded, but a single value dependent on the operating conditions of the assisted start is recorded only when an assisted start refusal is detected. Also, each encoding means allocates a value to a monitoring variable; this value corresponds to a particular state of the determined item of information. These distinct states therefore correspond to operating conditions of the assisted start.

According to yet another embodiment, each encoding means comprises a comparison module for generating a satisfactory condition signal based on the comparison between the determined item of information received and a threshold.

By providing a simple means for encoding the information items received with the aid of a comparison, it is possible to provide a small-sized means suitable for the needs for saving space in motor vehicles, and this also makes it possible to make the encoding system reliable by the use of a small number of computing modules which restricts the failures.

According to another embodiment, the detection means generates an encoding activation signal and a signal validity signal for each determined item of information received, and the distinct states of each item of information received are determined based on the satisfactory condition signal, on said signal validity signal and on said encoding activation signal.

Also added is a test of validity of the signals in order to ensure the reliability of the whole system. Equally, with the aid of three signals: a validity signal, an assisted start activation signal and a satisfactory condition signal, it is possible to create distinct states of operating condition.

According to another aspect, the subject of the invention is a method for diagnosing the operating state of an assisted starting mode of a motor vehicle, wherein an item of information on the rotation speed of an engine of the vehicle, an item of information on the position of the accelerator pedal of the vehicle, an item of information on the position of the gearbox and an item of information on the torque transmitted to the wheels are determined.

In this method, a malfunction of the assisted start is detected based on said items of information received, each determined item of information received is encoded with the aid of a monitoring signal, and said monitoring signals are saved.

According to another embodiment, when the assisted start is in operation, each item of information received is encoded by the modification of said monitoring signal by allocating thereto a value corresponding to distinct states of the determined item of information received.

According to yet another embodiment, a satisfactory condition signal is generated based on the comparison between the determined item of information received and a threshold before each item of information received is encoded.

According to another embodiment, an encoding activation signal and a signal validity signal are generated for each determined item of information received and the distinct states of each item of information received are determined based on the satisfactory condition signal, on said validity signal and on said encoding activation signal.

BRIEF DESCRIPTION OF THE DRAWINGS

Other objects, features and advantages of the invention will appear on reading the following description given only as a nonlimiting example, and made with reference to the appended drawings in which:

FIGS. 3a, 3b, 3c and 3d show a flow chart illustrating the main phases of a method for detecting an assisted-start refusal; FIGS. 6a, 6b, 6c and 6d show a flow chart illustrating the main phases of a method for encoding an item of diagnostic information.

DETAILED DESCRIPTION OF THE INVENTION

Figure 1:
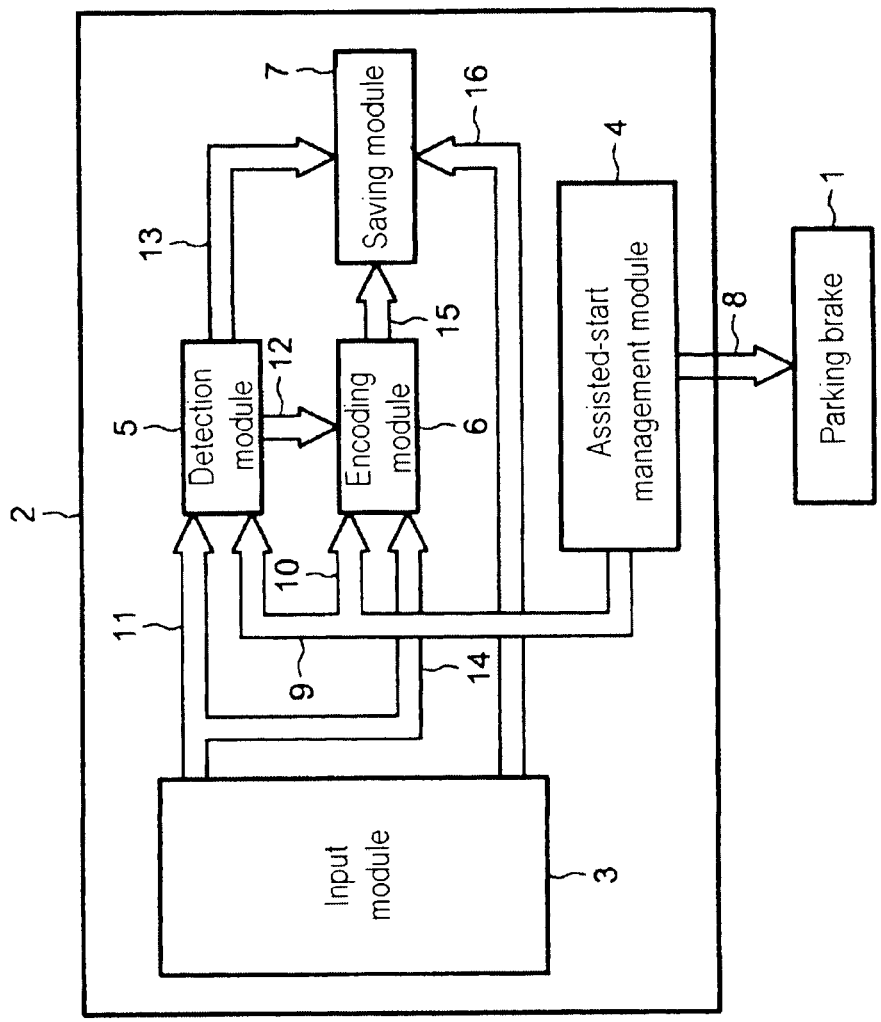
FIG. 1 is a schematic view of a diagnostic system according to the invention.

FIG. 1 represents a schematic view of a system for diagnosing the operating state of an assisted-start mode of a motor vehicle. The diagnostic system is essentially hosted within an electronic control unit (ECU) 2.

The ECU 2 comprises an input module 3, an assisted-start management module 4, a detection module 5, an encoding module 6 and a saving module 7. The operating principle of the diagnostic system consists in detecting, by means of the detection module 5, an assisted-start refusal, in activating encoding of the useful items of information with the aid of the encoding module 6 and in saving said items of encoded information and certain other items of information of the system by means of the saving module 7 in order to trace the history of the conditions of assisted-start refusal.

The input module 3 makes it possible to transmit useful items of information concerning the state of the vehicle to the various modules 5, 6 and 7 of the ECU 2, such as for example the speed of the vehicle and the rotation speed of the engine. These items of information can be measurements taken with the aid of sensors or be estimates made by computing modules of the ECU 2, not shown in the figure.

The assisted-start management module 4 hosts an algorithm controlling a parking brake 1 by sending application or release commands transmitted via the connection 8 to the parking brake 1. This module 4 also transmits signals to the detection module 5, which signals are transmitted via the connection 9, and to the encoding module 6, transmitted via the connection 10.

The detection module 5 detects an assisted-start refusal based on items of information originating from the management module 4 and based on items of information originating from the input module 3 and transmitted via the connection 11. This detection module 5 activates the encoding of the items of diagnostic information by sending signals, transmitted via the connection 12, to the encoding module 6. The module 5 also makes it possible to activate the saving of the items of information by sending signals, transmitted via the connection 13, to the saving module 7.

The encoding module 6 receives the items of information that are useful for the diagnosis to be encoded from the input module 3 and transmitted via the connection 14. The results thus encoded are then transmitted, via the connection 15, from the encoding module 6 to the saving module 7.

The saving module 7 records the items of information received from the detection module 5, the encoding module 6 and from the input module 3 transmitted respectively via the connections 13, 15 and 16. This module 7 is capable of recording the received items of information permanently in a non-volatile memory which may be, for example, of the EEPROM or "Electrically Erasable Programmable Read Only Memory" type.

Moreover, the connections 8 to 16 are capable of transferring several different signals from one module to the other of the ECU 2.

Figure 2:
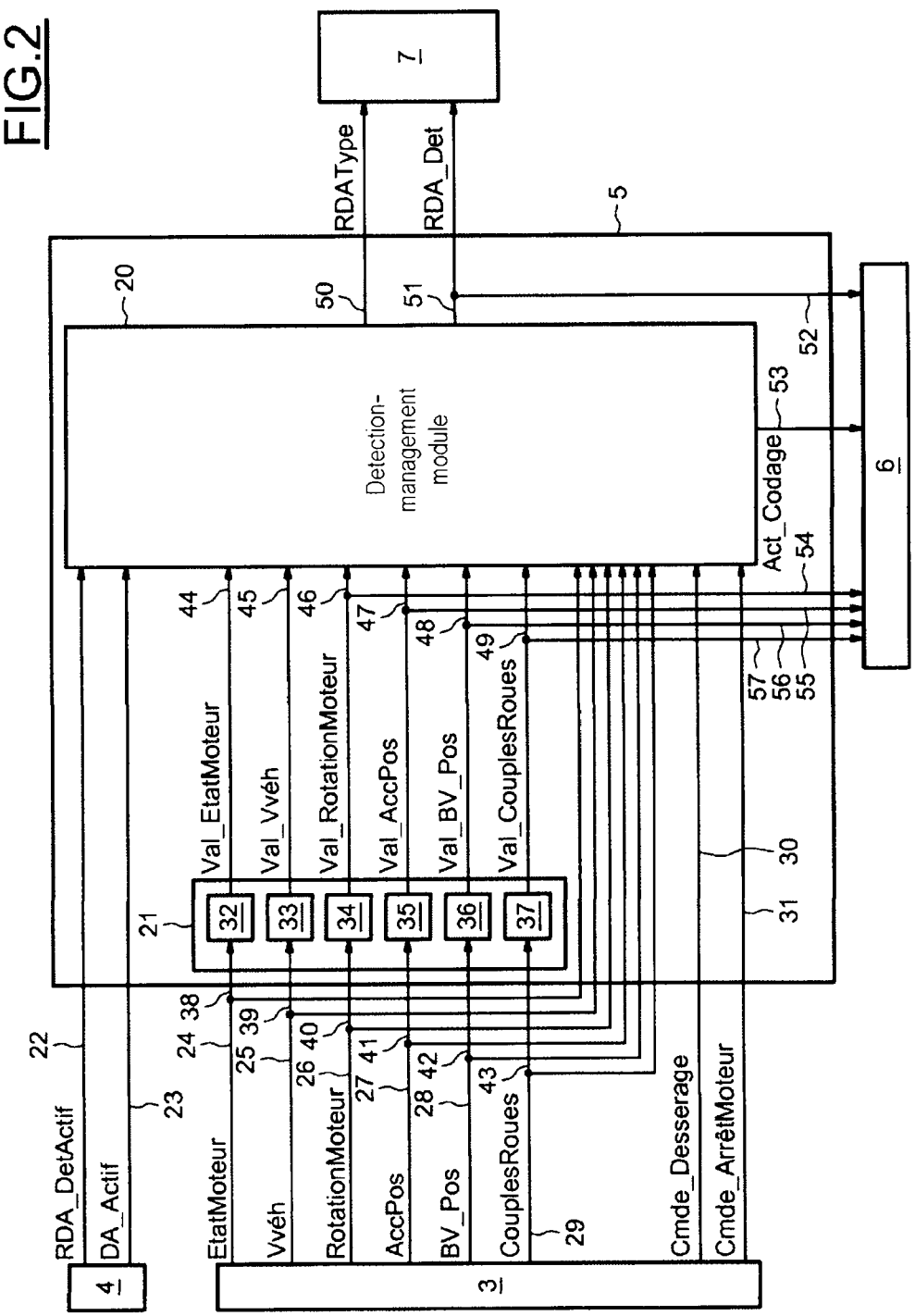
FIG. 2 is a schematic view of an embodiment of a module for detecting an assisted-start refusal.
Figure 3D:
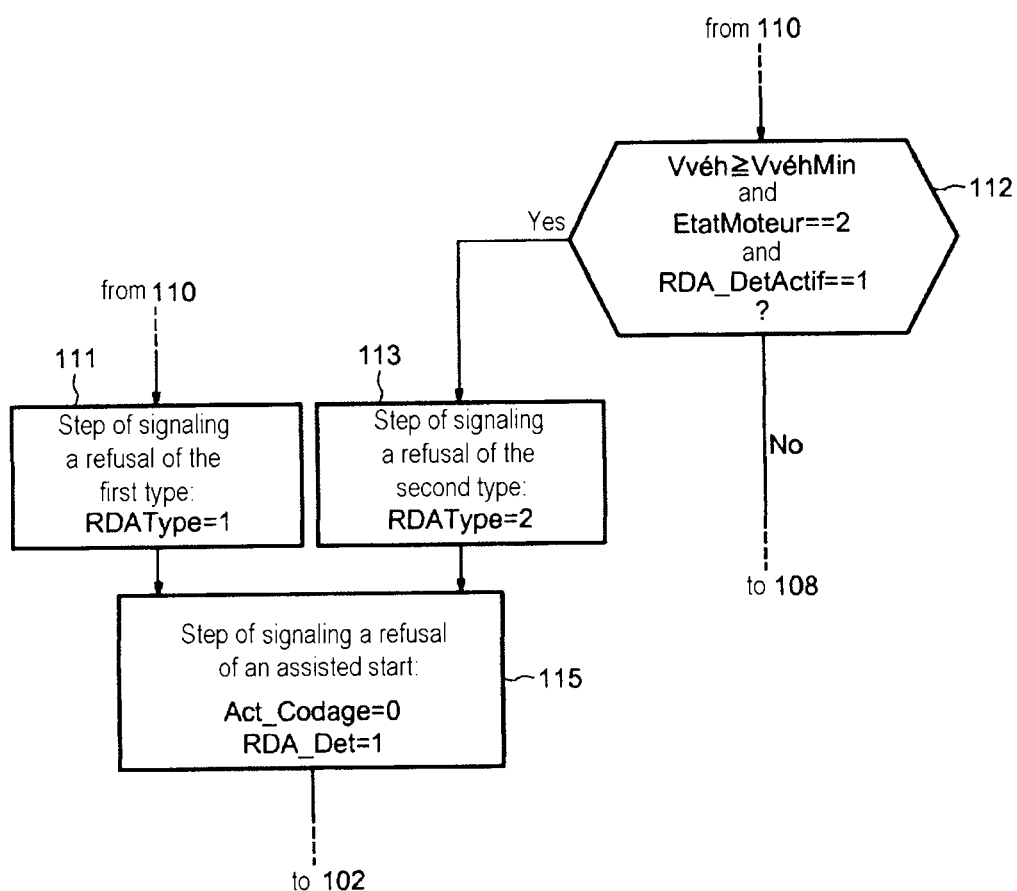

FIG. 2 represents a schematic view of an embodiment of a module 5 for detecting an assisted-start refusal. Also shown in FIG. 2 are elements previously described in FIG. 1.

The module 5 comprises a detection-management module 20 and a module 21 for testing the validity of signals.

The detection-management module 20 makes it possible to apply a method for detecting an assisted-start refusal which will be described later with reference to FIGS. 3a to 3d. This module 20 receives input signals RDA_DetActif and DA_Actif, originating from the assisted-start management module 4 and transmitted respectively via the connections 22 and 23.

RDA_DetActif: a Boolean signal which is:
  0 if the detection of an assisted-start refusal is disabled
  1 if the detection of an assisted-start refusal is enabled
DA_Actif: a Boolean signal which is:
  0 if the assisted start is disabled
  1 if the assisted start is enabled.

The signal RDA_DetActif is usually equal to 1 for enabling a detection of a refusal when the assisted start is enabled. But when the parking brake 1 is released or when the driver activates a command to carry out a manual start without assistance, the signal RDA_DetActif then has the value 0.

The module 20 also receives input signals EtatMoteur, Vvéh, RotationMoteur, AccPos, BV_Pos, CoupleRoues, Cmde_Desserrage and Cmde_ArretMoteur originating from the input module 3 and transmitted via the connections 24 to 31 respectively.

EtatMoteur: State of the engine which is:
  0 if the engine is stopped
  1 if the engine is driven
  2 if the engine is considered to be running stand alone, that is to say if the engine has a sufficiently high rotation speed to drive itself
Vvéh: Item of information on the speed of the vehicle
RotationMoteur: Item of information on the rotation speed of the engine
AccPos: Item of information on the position of the accelerator pedal of the vehicle
BV_Pos: Item of information on the position of the gearbox, or else, a Boolean signal which is:

0 if no gear is engaged (called "neutral position")
1 if at least one gear is engaged (a forward gear or reverse gear)

CoupleRoues: Item of information on the torque transmitted to the wheels

Cmde_Desserrage: a Boolean signal which is:
0 if there is no parking-brake release request
1 if there is a parking-brake release request Cmde_ArrêtMoteur: a Boolean signal which is:
0 if the driver makes no request to stop the engine
1 if the driver requests to stop the engine.

The signal-validity test module 21 makes it possible to test whether certain received signals are valid. In FIG. 2, only certain signals are tested. It will be possible advantageously to test the validity of all the input signals of the detection module 5. The module 21 comprises test modules 32 to 37 to test the validity of the signals received respectively via the connections 38 to 43. Each test module 32 to 37 is capable of generating a validity Boolean signal as a function of the test result. The module 21 generates the following signals:

Val_EtatMoteur: a Boolean signal of the validity of the EtatMoteur signal, which is:
0 if the EtatMoteur signal is not valid
1 if the EtatMoteur signal is valid Val_Vvéh: a Boolean signal of the validity of the Vvéh signal, which is:
0 if the Vvéh signal is invalid
1 if the Vvéh signal is valid Val_RotationMoteur: a Boolean signal of the validity of the RotationMoteur signal, which is:
0 if the RotationMoteur signal is invalid
1 if the RotationMoteur signal is valid Val_AccPos: a Boolean signal of the validity of the AccPos signal, which is:
0 if the AccPos signal is invalid
1 if the AccPos signal is valid For example: DA_Actif is 0 if Val_AccPos is 0;

Val_BV_Pos: a Boolean signal of the validity of the BV_Pos signal, which is:
0 if the BV_Pos signal is invalid
1 if the BV_Pos signal is valid Val_CoupleRoues: a Boolean signal of the validity of the CoupleRoues signal, which is:
0 if the CoupleRoues signal is invalid
1 if the CoupleRoues signal is valid.

It is possible to describe examples of tests of the validity of a signal that can be carried out by the test modules 32 to 37. It is possible, for example, to describe the validity test of the Val_RotationMoteur signal. The RotationMoteur signal is considered invalid (that is to say that the Val_RotationMoteur signal is 0) if, for example, the value received by the module 34 is outside an acceptable range of variation, this range being between a minimum value and a maximum value. The RotationMoteur signal can also be considered invalid if it is not received by means of several frames transmitted from the input module 3 over the connection 40 for a certain time, for example for more than 1 second, or else if the RotationMoteur signal is inconsistent (for example: RotationMoteur>0 and the engine is also declared stopped EtatMoteur=0).

The module 20 also receives the abovementioned validity signals Val_EtatMoteur, Val_Vvéh, Val_RotationMoteur, Val_AccPos, Val_BV_Pos and Val_CoupleRoues originating from the module 21 and transmitted via the connections 44 to 49 respectively.

Based on a method for detecting an assisted-start refusal which can be implemented in the detection-management module 20, the module 20 generates output signals as follows:

RDAType: type of assisted-start refusal and which is:
0 which means that the signal has been initialized
1 if the assisted-start refusal is of the first type "engine stall"
2 if the assisted-start refusal is of the second type "start with brake engaged"

RDA_Det: a Boolean signal which is:
0 if no assisted-start refusal is detected
1 if an assisted-start refusal is detected Act_Codage: a Boolean signal which is:
0 if the encoding of the items of information is disabled
1 if the encoding of the items of information is enabled.

The RDA_Det signal makes it possible to signal to the encoding module 6 and to the saving module 7 that an assisted-start refusal has been detected. It is considered that an assisted-start refusal is a malfunction of the assisted start; the signal of a refusal is therefore equivalent to a signal of malfunction.

The Act_Codage signal makes it possible to enable the encoding of the diagnostic information items by activating the encoding module 6. The RDAType signal makes it possible to distinguish the type of assisted-start refusal. It will be noted that there are two types of assisted-start refusal:

a first type "engine stall": which describes a situation in which, during the assisted start, the engine stalls with the parking brake 1 engaged, without activation of the Cmde_Desserrage command to release said brake 1, and with the driver desiring to start the vehicle; and a second type "start with brake engaged": which describes a situation in which, during the assisted start, the vehicle starts with the parking brake 1 engaged and without activation of the Cmde_Desserrage command to release said brake 1.

It is considered that the driver desires to start the vehicle if at least two conditions are met out of the following three:
the driver engages a gear ratio;
the driver pushes down the accelerator pedal beyond a certain threshold, marked AccPosMin, of accelerator pedal position;
the torque transmitted to the wheels is higher than a threshold, marked CoupleRouesMin.

Specifically, if the above three conditions are all met, an assisted start is carried out without refusal. Otherwise, an assisted-start refusal signal is enabled by means of the detection module 5.

The RDAType and RDA_Det signals are transmitted respectively via the connections 50 and 51 to the saving module 7. The RDA_Det, Act_Codage signals and the Val_RotationMoteur, Val_AccPos, Val_BV_Pos and Val_CoupleRoues validity signals are transmitted respectively via the connections 52 to 57 to the encoding module 6.

FIGS. 3a, 3b, 3c and 3d show a flow chart illustrating the main phases of a method for detecting an assisted-start refusal. The method begins with an initial step 100. This step is carried out as soon as an assisted start is enabled. After this initial step 100, a comparison step 101 is carried out in which the validity of the Val_Vvéh and Val_EtatMoteur signals and the value of the Cmde_ArrêtMoteur signal are tested.

The following three conditions are considered:
the item of information on vehicle speed is valid (Val_Vvéh is 1)
the item of information on the state of the engine is valid (Val_EtatMoteur is 1)

the driver has not requested a stop of the engine (Cmde_ArrêtMoteur is 0).

If these three conditions are met, the method moves on to a waiting step 102, otherwise the initial step 100 is carried out again. Moreover, it is possible to test the validity of these three conditions at any time during the execution of the method and, if one of these three conditions is not met, there is a return to the initial step 100.

In the waiting step 102, the following signals are first set to the zero value:
Act_Codage=0
RDA_Det=0
RDAType=0

Then, secondly, the comparison steps 103 and 104 are carried out to test whether the vehicle can be considered to be stationary.

In the comparison step 103, the validity of the following three conditions is tested:
the item of information on the speed of the vehicle is invalid (Val_Vvéh is 0)
the item of information on the state of the engine is invalid (Val_EtatMoteur is 0)
the driver has requested a stop of the engine (Cmde_ArrêtMoteur is 1).

If at least one of these three conditions is met, there is a return to the initial step 100, otherwise the following comparison step 104 is carried out.

In the comparison step 104, the validity of the following two conditions is tested:
the item of information on the speed of the vehicle is zero (Vvéh is 0), and the engine is in the stand alone running state (EtatMoteur is 2) for a stop time $t_{arrêt}$
the detection of an assisted-start refusal is enabled (RDA_DetActif is 1).

If the two conditions are met, it is considered that the vehicle is stationary with the engine in the stand alone running state and a step 105 of preparing for starting is carried out, otherwise the waiting step 102 is carried out again.

During the step 105 of preparing for starting, the comparison steps 106 and 107 are carried out to test whether the conditions are met for considering that an assisted start is in progress. To do this, the comparison step 106 is carried out in which the validity of the following three conditions is tested:
the item of information on the speed of the vehicle is greater than or equal to the vehicle-speed threshold VvéhMin (Vvéh>=VvéhMin)
the engine is no longer considered to be in a stand alone running state (EtatMoteur is not 2)
the detection of an assisted-start refusal is disabled (RDA_DetActif is 0), for example if the parking brake 1 is not engaged.

If at least one of these three conditions is met, there is a return to the waiting step 102, otherwise the following comparison step 107 is carried out. For example, if the engine is no longer in a stand alone running state or if the vehicle is accelerating so that the speed of the vehicle exceeds the speed threshold VvéhMin, there is a return to the waiting step 102.

In the comparison step 107, the validity tests of the following three conditions are carried out:
the item of vehicle-speed information is strictly below the vehicle-speed threshold VvéhMin (Vvéh<VvéhMin), and the engine is in the stand alone running state (EtatMoteur is 2) for the stop time $t_{arrêt}$
the detection of an assisted-start refusal is enabled (RDA_DetActif is 1)
{at least one of the following four conditions is met:
condition 1: the driver is pressing down the accelerator pedal of the vehicle (AccPos>AccPosMin) and the item of information on the position of the accelerator pedal is valid (Val_AccPos is 1)
condition 2: the driver engages a gear ratio (BV_Pos is 1) and the item of information on an engaged gear is valid (Val_BV_Pos is 1)
condition 3: the torque transmitted to the wheels is greater than a minimum threshold (CoupleRoues>CoupleRouesMin) and the item of information on the torque transmitted to the wheels is valid (Val_CoupleRoues is 1)
condition 4: the assisted start is disabled (DA_Actif is 0)}.

If these three conditions are met, a next step 108 of assisted start in progress is carried out and the step 105 of preparing for starting is again carried out in the contrary case.

In the step 108, initially the following signals are modified in order to obtain:
Act_Codage=1
RDA_Det=0
RDAType=0

Then, secondly, the comparison steps 109, 110 and 112 are carried out to detect whether an assisted-start refusal is enabled.

In the comparison step 109, the validity of the following three conditions is tested:
the detection of an assisted-start refusal is disabled (RDA_DetActif is 0)
the parking-brake release command is sent (Cmde_Desserrage is 1)
the engine is not in a stand alone running state (EtatMoteur not 2) and there is no detection of an assisted-start refusal (RDA_Det is 0).

If at least one of these three conditions is met, there is a return to the waiting step 102, otherwise the following comparison step 110 is carried out.

In the comparison step 110, a validity test is carried out to detect whether an assisted-start refusal of the first type is enabled by carrying out the validity tests of the following five conditions:
the item of information on vehicle speed is strictly below the vehicle-speed threshold VvéhMin (Vvéh<VvéhMin)
the engine is not in the stand alone running state (EtatMoteur not 2)
the parking-brake release command is not sent (Cmde_Desserrage is 0)
the detection of an assisted-start refusal is enabled (RDA_DetActif is 1)
{at least one of the following three conditions is met:
condition 1: a gear ratio is engaged (BV_Pos is 1) and the item of information on the position of the gearbox is valid (Val_BV_Pos is 1) and the driver is pressing down the accelerator pedal of the vehicle (AccPos>AccPosMin) and the item of information on the position of the accelerator pedal is valid (Val_AccPos is 1)
condition 2: the driver is pressing down the accelerator pedal of the vehicle (AccPos>AccPosMin) and the item of information on the position of the accelerator pedal is valid (Val_AccPos is 1) and the torque transmitted to the wheels is strictly greater than a minimum threshold (CoupleRoues>CoupleRouesMin) and the item of information on the torque transmitted to the wheels is valid (Val_CoupleRoues is 1)
condition 3: a gear ratio is engaged (BV_Pos is 1) and the item of information on the position of the gearbox is valid (Val_BV_Pos is 1) and the torque transmitted to the wheels is strictly greater than a minimum threshold (CoupleRoues>CoupleRouesMin) and the item of information on the torque transmitted to the wheels is valid (Val_CoupleRoues is 1)}.

If these five conditions are met, it means that a refusal of the first type is detected; in this case, a step 111 of signaling a refusal of the first type is carried out, otherwise a comparison step 112 is carried out.

In the step 111 of signaling a refusal of the first type, the value of the RDAType signal is modified by allocating it the value 1 (RDAType is 1), which means that an assisted-start refusal of the first type has been detected. After this signaling step 111, a step 115 of signaling a refusal of an assisted start is carried out which will be described later.

In the comparison step 112, a validity test is carried out to detect whether an assisted-start refusal of the second type is enabled by carrying out the validity tests of the following three conditions:
the item of information on the vehicle speed is greater than or equal to the vehicle-speed threshold VvéhMin (Vvéh>=VvéhMin)
the engine is in the stand alone running state (EtatMoteur is 2)
the detection of an assisted-start refusal is enabled (RDA_ DetActif is 1).

If these three conditions are met, it means that a refusal of the second type is detected; in this case, a step 113 of signaling a refusal of the second type is carried out, otherwise the step 108 of assisted start in progress is carried out.

In the step 113 of signaling a refusal of the second type, the value of the RDAType signal is modified by allocating it the value 2 (RDAType is 2), which means that an assisted-start refusal of the second type has been detected. After this signaling step 113, the step 115 of signaling an assisted-start refusal is carried out.

In the step 115 of signaling an assisted-start refusal, the RDA_Det signal is modified by allocating it the value 1 (RDA_Det is 1), which means that an assisted-start refusal has been detected. The Act_Codage signal is also modified by allocating it the value 0 (Act_Codage is 0), which means that the encoding of the diagnostic information items is stopped. After the signaling step 115, the waiting step 102 is carried out.

The method for detecting the assisted-start refusal makes it possible, based on the diagnostic signals established by the input module 3, to signal, by the enabling of the RDA_Det signal, that a start refusal has been detected. The method also makes it possible to determine the type of refusal and the signal by the management of the RDAType signal. Moreover, the method enables, by means of the Act_Codage signal, the encoding module 6 when an assisted start is in progress.

The steps of the detection method can be implemented by an electronic circuit or in software form, or in a programmable controller, implemented in the detection module 5.

Figure 4:
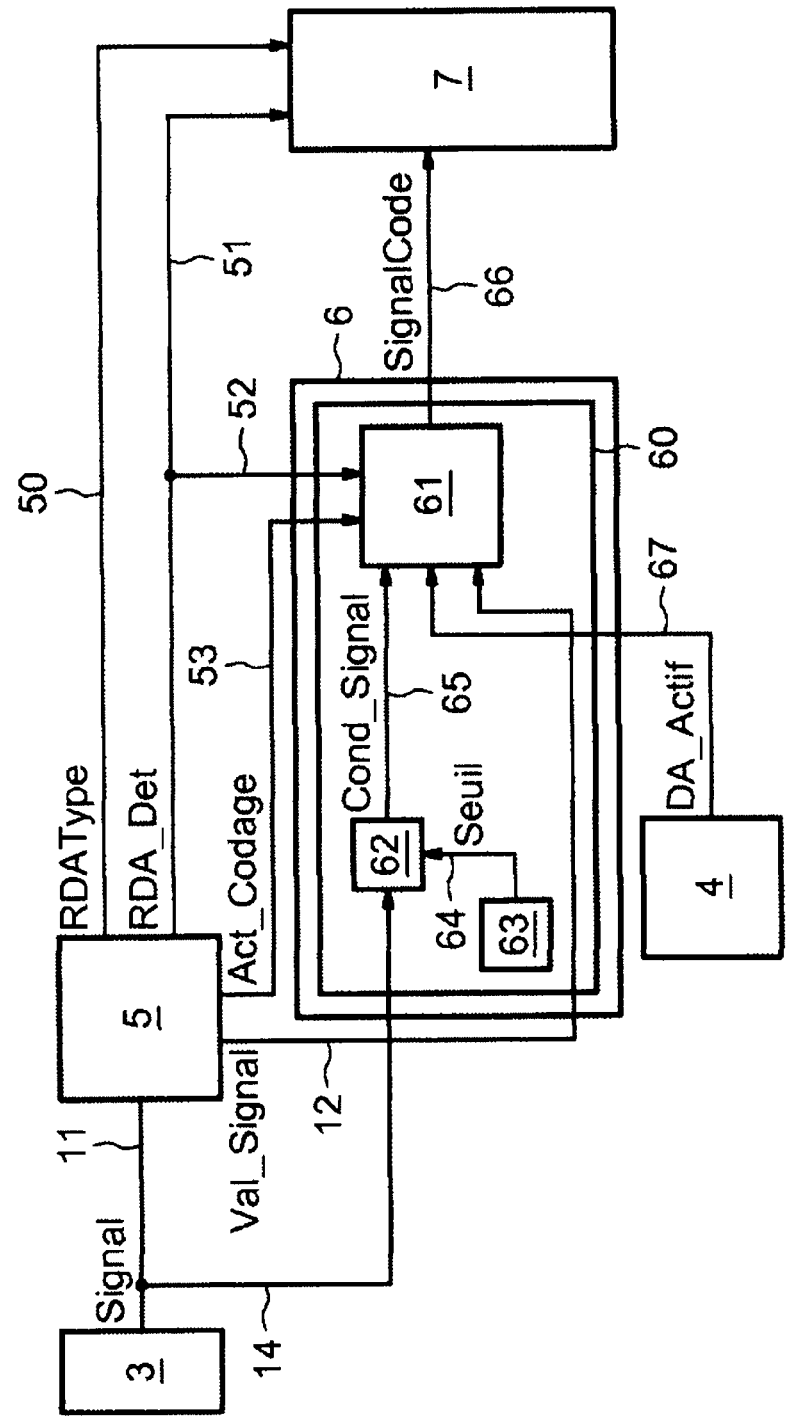
FIG. 4 is a schematic view of a general embodiment of a module for encoding an item of diagnostic information.

FIG. 4 shows a schematic view of a general embodiment of a module for encoding an item of diagnostic information. Also shown in FIG. 4 are elements previously described with reference to FIGS. 1 and 2.

The encoding module 6 comprises an encoding means 60 for encoding an item of diagnostic Signal information sent from the input module 3 and transmitted via the connection 14. This item of Signal information may be, for example, the EtatMoteur, Vvéh or RotationMoteur information item.

The encoding means 60 makes it possible to receive a Signal signal, or an item of information, from the input module 3 for comparing this Signal information item with a threshold, marked Seuil, in order to transmit a Boolean Cond_ Signal signal of satisfactory condition as a function of the comparison result. Then, with the aid of an encoding method, which will be described below with reference to FIGS. 6a to 6d, a monitoring SignalCode signal is generated as a function of the evolution over time of the Cond_Signal signal during the assisted start. The generation of the monitoring SignalCode signal is enabled when the Act_Codage input signal is 1 and said monitoring signal is saved, by means of the saving module 7, when an assisted-start refusal is detected, that is to say when the RDA_Det signal is 1.

The encoding means 60 comprises an encoding block 61, a comparison means 62 and a configurable module 63 for generating the Seuil signal. The comparison module 62 compares the Signal signal, originating from the input module 3 and transmitted via the connection 14, with the Seuil signal originating from the module 63 and transmitted via a connection 64. The comparison module sends the Cond_Signal result of the comparison, transmitted via a connection 65, to the encoding block 61.

The satisfactory condition Cond_Signal signal, the result of the comparison, is determined as follows:
Cond_Signal: a Boolean signal which is:
0 if the result of the comparison between the Signal and Seuil signals is false
1 if the result of the comparison between the Signal and Seuil signals is true.

The encoding block 61 also receives a Val_Signal signal from the detection module 5 via the connection 12, the RDA_ Det signal from the detection module 5 via the connection 52, the Act_Codage signal from the detection module 5 via the connection 53 and the DA_Actif signal from the assisted-start management module 4 via a connection 67. The Val_Signal signal corresponds to a Boolean signal of validity which is generated by the signal-validity test module 21. This Val_Signal signal makes it possible to determine the validity of the Signal signal:
Val_Signal: a Boolean signal of validity of the Signal signal, which is:
0 if the Signal signal is invalid
1 if the Signal signal is valid.

After the execution of the encoding method carried out by the encoding block 61, said block 61 sends the SignalCode monitoring signal which corresponds to the result of the encoding method and transmits it via a connection 66 to the saving module 7.

Figure 5:
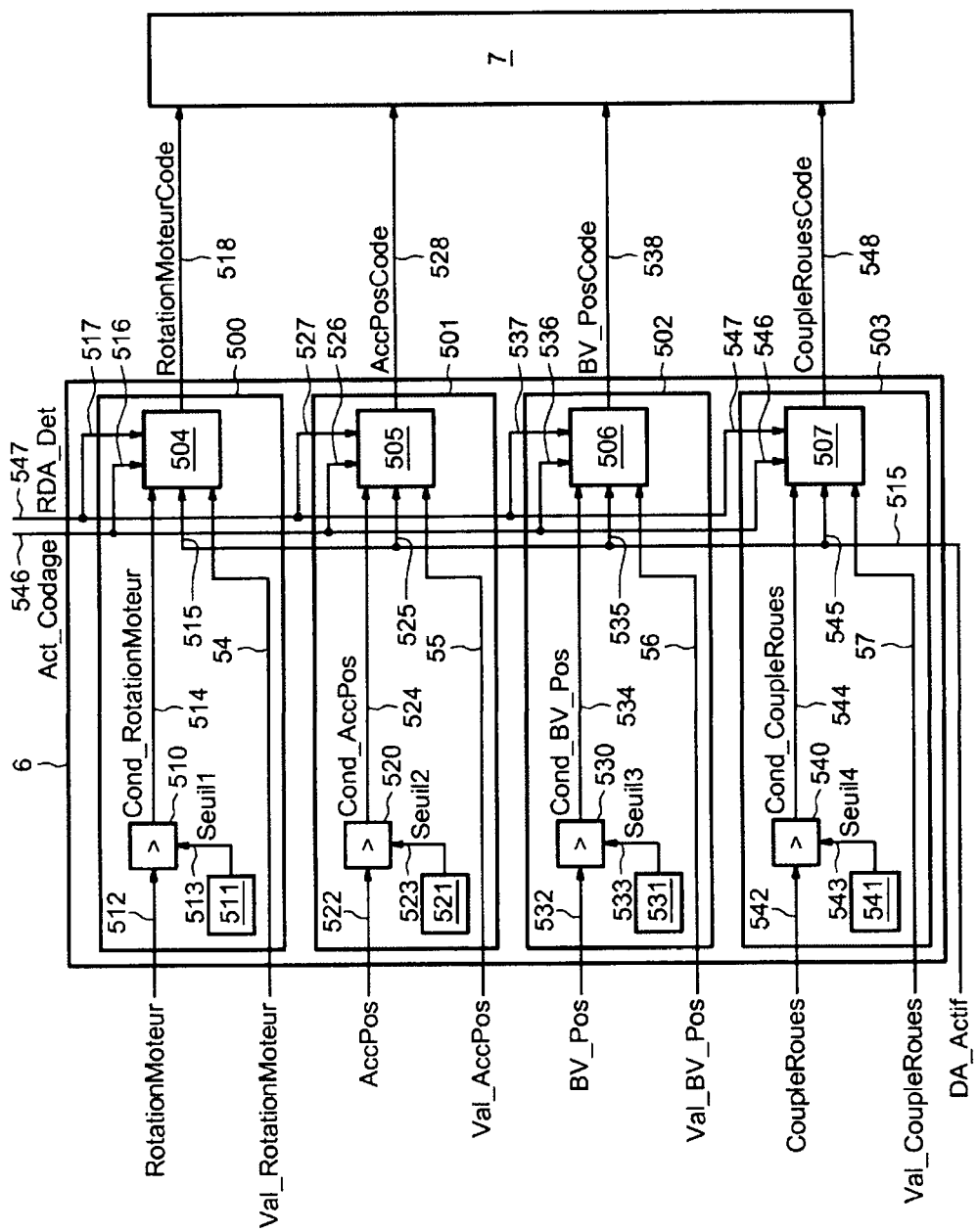
FIG. 5 is a schematic view of an embodiment of a module for encoding items of diagnostic information.
Figure 6D:
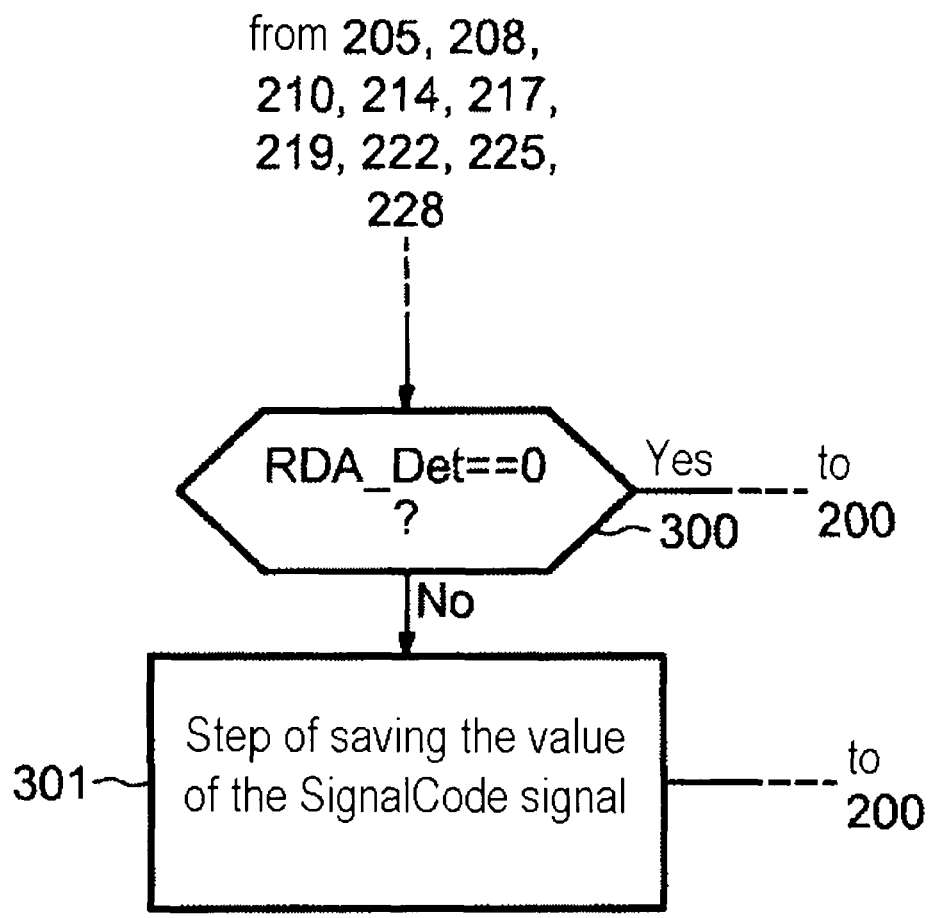

FIG. 5 shows a schematic view of an embodiment of a module 6 for encoding the items of diagnostic information. Also shown in FIG. 5 are elements previously described with reference to FIGS. 1 to 4.

The encoding module 6 comprises encoding means 500 to 503 for encoding the items of received diagnostic information. Each encoding means 500 to 503 comprises respectively an encoding block 504 to 507. The encoding blocks 504 to 507 each make it possible to apply a method for encoding the items of diagnostic information. This method for encoding an item of diagnostic information will be described later with reference to FIGS. 6a to 6d. The encoding method is identical for each encoding block 504 to 507.

The signals representing the items of diagnostic information have been selected from many signals which report the general state of the system. Four main signals have been selected, RotationMoteur, AccPos, BV_Pos and CoupleRoues, which represent four conditions which must be met simultaneously in order to generate an automatic command to release the parking brake 1.

The encoding means 500 also comprises a comparison means 510 and a module 511 for generating a configurable Seuil1 threshold. The comparison means 510 compares the RotationMoteur signal, originating from the input module 3 and transmitted via a connection 512, with the Seuil1 threshold originating from the module 511 and transmitted via a connection 513. The comparison means 510 sends the Cond_RotationMoteur result of the comparison, transmitted via a connection 514, to the encoding block 504. The Cond_RotationMoteur signal of satisfactory condition, the result of the comparison, is determined as follows:

Cond_RotationMoteur: a Boolean signal which is:
0 if the rotation speed of the engine is insufficient to allow an assisted start, that is to say if the item of information on the rotation speed of the engine RotationMoteur is less than or equal to the Seuil1 threshold
1 if the rotation speed of the engine is sufficient to allow an assisted start, that is to say if the item of information on the rotation speed of the engine RotationMoteur is strictly greater than the Seuil1 threshold.

The encoding block 504 also receives the Val_RotationMoteur signal from the detection module 5 via the connection 54, the DA_Actif signal from the assisted-start management module 4 via a connection 515, the Act_Codage signal from the detection module 5 via a connection 516 and the RDA_Det signal from the detection module 5 via a connection 517. The encoding block 504 sends a monitoring signal RotationMoteurCode which corresponds to the result of the encoding method and transmits it via a connection 518 to the saving module 7.

The encoding means 501 also comprises a comparison means 520 and a module 521 for generating a configurable Seuil2 threshold. The comparison means 520 compares the AccPos signal, originating from the input module 3 and transmitted via a connection 522, with the Seuil2 threshold originating from the module 521 and transmitted via a connection 523. The comparison means 520 sends the Cond_AccPos result of the comparison, transmitted via a connection 524, to the encoding block 505. The Cond_AccPos satisfactory condition signal, the result of the comparison, is determined as follows:

Cond_AccPos: a Boolean signal which is:
0 if the position of the accelerator pedal of the vehicle is insufficient to allow an assisted start, that is to say if the item of information on the speed position of the accelerator pedal of the vehicle AccPos is less than or equal to the Seuil2 threshold
1 if the position of the accelerator pedal of the vehicle is sufficient to allow an assisted start, that is to say if the item of information on the speed position of the accelerator pedal of the vehicle AccPos is strictly above the Seuil2 threshold.

The encoding block 505 also receives the Val_AccPos signal from the detection module 5 via the connection 55, the DA_Actif signal from the assisted-start management module 4 via a connection 525, the Act_Codage signal from the detection module 5 via a connection 526 and the RDA_Det signal from the detection module 5 via a connection 527. The encoding block 505 sends a monitoring AccPosCode signal which corresponds to the result of the encoding method and transmits it via a connection 528 to the saving module 7.

The encoding means 502 also comprises a comparison means 530 and a module 531 for generating a configurable Seuil3 threshold. The comparison means 530 compares the BV_Pos signal, originating from the input module 3 and transmitted via a connection 532, with the Seuil3 threshold originating from the module 531 and transmitted via a connection 533. The comparison means 530 sends the Cond_BV_Pos result of the comparison, transmitted via a connection 534, to the encoding block 506. The satisfactory condition Cond_BV_Pos signal, the result of the comparison, is determined as follows:

Cond_BV_Pos: a Boolean signal which is:
0 if no gear ratio is engaged, that is to say if the item of information on the position of the gearbox is equal to the Seuil3 threshold (where Seuil3 is equal to 0)
1 if at least one gear ratio is engaged, that is to say if the item of information on the position of the gearbox is strictly greater than said Seuil3.

The encoding block 506 also receives the Val_BV_Pos signal from the detection module 5 via the connection 56, the DA_Actif signal from the assisted-start management module 4 via a connection 535, the Act_Codage signal from the detection module 5 via a connection 536 and the RDA_Det signal from the detection module 5 via a connection 537. The encoding block 506 sends a monitoring BV_PosCode signal which corresponds to the result of the encoding method and transmits it via a connection 538 to the saving module 7.

The encoding means 503 also comprises a comparison means 540 and a module 541 for generating a configurable Seuil4 threshold. The comparison means 540 compares the CoupleRoues signal, originating from the input module 3 and transmitted via a connection 542, with the Seuil4 threshold originating from the module 541 and transmitted via a connection 543. The comparison means 540 sends the Cond_CoupleRoues result of the comparison, transmitted via a connection 544, to the encoding block 507. The satisfactory condition Cond_CoupleRoues signal, the result of the comparison, is determined as follows:

Cond_CoupleRoues: a Boolean signal which is:
0 if the torque transmitted to the wheels is insufficient to allow an assisted start, that is to say if the item of information on the torque transmitted to the wheels CoupleRoues is less than or equal to the Seuil4 threshold
1 if the torque transmitted to the wheels is sufficient to allow an assisted start, that is to say if the item of information on the torque transmitted to the wheels CoupleRoues is strictly greater than the Seuil4 threshold.

The encoding block 507 also receives the Val_CoupleRoues signal from the detection module 5 via the connection 57, the DA_Actif signal from the assisted-start management module 4 via a connection 545, the Act_Codage signal from the detection module 5 via a connection 546 and the RDA_Det signal from the detection module 5 via a connection 547. The encoding block 507 sends a monitoring CoupleRouesCode signal which corresponds to the result of the encoding method and transmits it via a connection 548 to the saving module 7.

It will be noted that the various thresholds Seuil1 to Seuil4 can be configured and are determined as a function of the slope, the weight of the vehicle, the engine type, etc.

Similarly, the encoding module 6 may comprise other encoding means for encoding the item of diagnostic information of other signals.

FIGS. 6a, 6b, 6c and 6d represent a flow chart illustrating the main phases of a method for encoding an item of diagnostic information. This method can be applied to any item of information selected for the purpose of producing a diagnosis, such as for example to the items of information BV_Pos, RotationMoteur, AccPos or CoupleRoues.

The encoding method consists in monitoring the temporal evolution of an item of diagnostic Signal information transmitted by the input module 3. This item of diagnostic Signal information may change value during the assisted start. These various changes correspond to distinct states of the item of diagnostic Signal information. Moreover, the method is capable of determining the distinct states of this item of diagnostic Signal information and of allocating a different value to the monitoring SignalCode signal for each distinct state.

The encoding method begins with an initial step 200. During this step 200, the SignalCode output signal is set to the value −1.

After this initial step 200, a comparison step 201 is carried out in which the validity of the following condition is tested:
the encoding of the items of information is enabled (Act_Codage is 1).

If this condition is verified, a comparison step 202 is carried out, otherwise the initial step 200 is carried out again.

In the comparison step 202, the validity of the following three conditions is tested:
the satisfactory condition signal is false (Cond_Signal is 0)
the item of Signal information is valid (Val_Signal is 1)
the assisted start is enabled (DA_Actif is 1).

If the three conditions are verified, a step 203 is carried out, otherwise a following comparison step 211 is carried out.

In the comparison step 211, the validity of the following three conditions is tested:
the satisfactory condition signal is true (Cond_Signal is 1)
the item of Signal information is valid (Val_Signal is 1)
the assisted start is enabled (DA_Actif is 1).

If the three conditions are met, a step 212 is carried out, otherwise a following comparison step 220 is carried out.

In the comparison step 220, the validity of the following two conditions is tested:
the item of Signal information is invalid (Val_Signal is 0)
the assisted start is disabled (DA_Actif is 0).

If the two conditions are met, a step 221 is carried out, otherwise a following comparison step 223 is carried out.

In the step 221, the code 6 is allocated to the monitoring SignalCode signal (SignalCode is 6), then a comparison step 222 is carried out in which the value of the Act_codage signal is tested. If the Act_codage signal is 1, the step 221 is carried out again, otherwise the encoding of the item of received Signal information is stopped and a step 300 is carried out to finish the encoding.

In the comparison step 223, the validity of the following two conditions is tested:
the item of Signal information is valid (Val_Signal is 1)
the assisted start is disabled (DA_Actif is 0).

If the two conditions are met, a step 224 is carried out, otherwise a following comparison step 226 is carried out.

In the step 224, the code 7 is allocated to the monitoring SignalCode signal (SignalCode is 7), then a comparison step 225 is carried out in which the value of the Act_codage signal is tested. If the Act_codage signal is 1, the step 224 is carried out again, otherwise the encoding of the item of received Signal information is stopped and a step 300 is carried out to finish the encoding.

In the comparison step 226, the validity of the following two conditions is tested:
the item of Signal information is invalid (Val_Signal is 0)
the assisted start is enabled (DA_Actif is 1).

If the two conditions are met, a step 227 is carried out, otherwise the initial step 200 is carried out again.

In the step 227, the code 8 is allocated to the monitoring SignalCode signal (SignalCode is 8), then a comparison step 228 is carried out in which the value of the Act_codage signal is tested. If the Act_codage signal is 1, the step 227 is carried out again, otherwise the encoding of the item of received Signal information is stopped and a step 300 is carried out to finish the encoding.

In the step 203, the code 0 is allocated to the monitoring SignalCode signal (SignalCode is 0), then a comparison step 204 is carried out in which the value of the satisfactory condition Cond_Signal signal is tested. If the Cond_Signal signal is 1, a step 206 is carried out, otherwise a comparison step 205 is carried out.

In the comparison step 205, the value of the Act_codage signal is tested. If the Act_codage signal is 1, the step 203 is carried out again, otherwise the encoding of the item of received Signal information is stopped and a step 300 is carried out to finish the encoding.

In the step 206, the code 1 is allocated to the monitoring SignalCode signal (SignalCode is 1), then a comparison step 207 is carried out in which the value of the satisfactory condition Cond_Signal signal is tested. If the Cond_Signal signal is 0, a step 209 is carried out, otherwise a comparison step 208 is carried out.

In the comparison step 208, the value of the Act_codage signal is tested. If the Act_codage signal is 1, the step 206 is carried out again, otherwise the encoding of the item of received Signal information is stopped and a step 300 is carried out to finish the encoding.

In the step 209, the code 2 is allocated to the monitoring SignalCode signal (SignalCode is 2), then a comparison step 210 is carried out in which the value of the Act_codage signal is tested. If the Act_codage signal is 1, the step 209 is carried out again, otherwise the encoding of the item of received Signal information is stopped and a step 300 is carried out to finish the encoding.

In the step 212, the code 3 is allocated to the monitoring SignalCode signal (SignalCode is 3), then a comparison step 213 is carried out in which the value of the satisfactory condition Cond_Signal signal is tested. If the Cond_Signal signal is 0, a step 215 is carried out, otherwise a comparison step 214 is carried out.

In the comparison step 214, the value of the Act_codage signal is tested. If the Act_codage signal is 1, the step 212 is carried out again, otherwise the encoding of the item of received Signal information is stopped and a step 300 is carried out to finish the encoding.

In the step 215, the code 4 is allocated to the monitoring SignalCode signal (SignalCode is 4), then a comparison step 216 is carried out in which the value of the satisfactory condition Cond_Signal signal is tested. If the Cond_Signal signal is 1, a step 218 is carried out, otherwise a comparison step 217 is carried out.

In the comparison step 217, the value of the Act_codage signal is tested. If the Act_codage signal is 1, the step 215 is carried out again, otherwise the encoding of the item of received Signal information is stopped and a step 300 is carried out to finish the encoding.

In the step 218, the code 5 is allocated to the monitoring SignalCode signal (SignalCode is 5), then a comparison step 219 is carried out in which the value of the Act_codage signal is tested. If the Act_codage signal is 1, the step 218 is carried out again, otherwise the encoding of the item of received Signal information is stopped and a step 300 is carried out to finish the encoding.

In the comparison step 300, a test is run to ascertain whether an assisted-start refusal has been detected during the assisted start. If a refusal is detected, the value of the monitoring SignalCode signal is saved, otherwise there is a return to the initial step 200.

Specifically, the comparison step 300 is carried out in which the value of the RDA_Det signal is tested. If the RDA_Det signal is 0, the initial step 200 is carried out again because no refusal has been detected. Otherwise, when the RDA_Det signal is 1, a saving step 301 is carried out in which the value of the monitoring SignalCode signal is recorded because a refusal has been detected, then the initial step 200 is carried out again.

The steps of the encoding method can be applied by an electronic circuit or in software form, or in a programmable controller, implemented in the encoding blocks 504 to 507.

The invention claimed is:

1. A system for diagnosing an operating state of an assisted starting mode of a motor vehicle including a drive engine and a gearbox, comprising:
    a processor programmed to
        determine an item of information on engine rotation speed, an item of information on a position of an accelerator pedal of the vehicle, an item of information on a position of a gearbox, and an item of information on torque transmitted to wheels,
        determine a validity of each item of information;
        generate, during operation of the assisted starting mode, a signal of malfunction of an assisted start in response to at least one of the item of information on the engine speed, the item of information on the position of the accelerator pedal of the vehicle, the item of information on the position of the gearbox, and the item of information on the torque transmitted to the wheels failing to exceed a predetermined threshold, and
        to generate a monitoring signal for each determined item of information; and
    a memory that saves the monitoring signals,
        wherein, in response to generation of the signal of malfunction, the processor allocates to each monitoring signal a signal code corresponding to a distinct state of the determined item of information at a particular time, each distinct state indicating whether the monitoring signal is greater than a predetermined threshold at the particular time and whether the item of information corresponding to the monitoring signal is valid.

2. The diagnostic system as claimed in claim 1, wherein each distinct state further indicates whether the assisted start is in operation.

3. The diagnostic system as claimed in claim 2, wherein the processor generates an encoding activation signal for each determined item of information received, and the distinct states of each item of information received are determined based on the satisfactory condition signal, on the validity of the signal, and on the encoding activation signal.

4. A method for diagnosing an operating state of an assisted starting mode of a motor vehicle, the method comprising:
    determining, by a processor, an item of information on a rotation speed of an engine of the vehicle, an item of information on a position of an accelerator pedal of the vehicle, an item of information on a position of a gearbox, and an item of information on torque transmitted to wheels;
    determining a validity of each item of information;
    detecting, by the processor and during operation of the assisted starting mode, a malfunction of an assisted start in response to at least one of the item of information on the rotation speed of the engine of the vehicle, the item of information on the position of the accelerator pedal of the vehicle, the item of information on the position of the gearbox, and the item of information on the torque transmitted to the wheels failing to exceed a predetermined threshold;
    generating, by the processor, a monitoring signal for each determined item of information; and
    saving, in a memory, the monitoring signals,
    wherein, in response to generation of the signal of malfunction, the processor allocates to each monitoring signal a signal code corresponding to a distinct state of the determined item of information at a particular time, each distinct state indicating whether the monitoring signal is greater than a predetermined threshold at the particular time and whether the item of information corresponding to the monitoring signal is valid.

5. The diagnostic method as claimed in claim 4, wherein each distinct state further indicates whether the assisted start is in operation.

6. The diagnostic method as claimed in claim 5, wherein an encoding activation signal is generated for each determined item of information received and the distinct states of each item of information received are determined based on a satisfactory condition signal, on a validity of the monitoring signal, and on the encoding activation signal.

7. The diagnostic system as claimed in claim 1, wherein the processor is programmed to generate the signal of malfunction of the assisted start in response to at least three of the item of information on the engine speed, the item of information on the position of the accelerator pedal of the vehicle, the item of information on the position of the gearbox, and the item of information on the torque transmitted to the wheels failing to exceed a predetermined threshold.

8. The diagnostic system as claimed in claim 1, wherein the processor is programmed to generate the signal of malfunction of the assisted start in response to each of the item of information on the engine speed, the item of information on the position of the accelerator pedal of the vehicle, the item of information on the position of the gearbox, and the item of information on the torque transmitted to the wheels failing to exceed a predetermined threshold.

9. The diagnostic system as claimed in claim 1, wherein the signal code allocated to the monitoring signal is a single variable.

10. A non-transitory computer-readable medium storing computer-readable instructions thereon which when executed by a computer cause the computer to implement a method for diagnosing an operating state of an assisted starting mode of a motor vehicle, the method comprising:
    determining, by a processor, an item of information on a rotation speed of an engine of the vehicle, an item of information on a position of an accelerator pedal of the vehicle, an item of information on a position of a gearbox, and an item of information on torque transmitted to wheels;
    determining a validity of each item of information;
    detecting, by the processor and during operation of the assisted starting mode, a malfunction of an assisted start in response to at least one of the item of information on the rotation speed of the engine of the vehicle, the item of information on the position of the accelerator pedal of the vehicle, the item of information on the position of the gearbox, and the item of information on the torque transmitted to the wheels failing to exceed a predetermined threshold;
    generating, by the processor, a monitoring signal for each determined item of information; and saving, in a memory, the monitoring signals,
wherein, in response to generation of a signal of malfunction, the processor allocates to each monitoring signal a signal code corresponding to a distinct state of the determined item of information at a particular time, each distinct state indicating whether the monitoring signal is greater than a predetermined threshold at the particular time and whether the item of information corresponding to the monitoring signal is valid.

\* \* \* \* \*